J. D. Frary,
Table Knife.
N° 77,026. Patented Apr. 21, 1868.
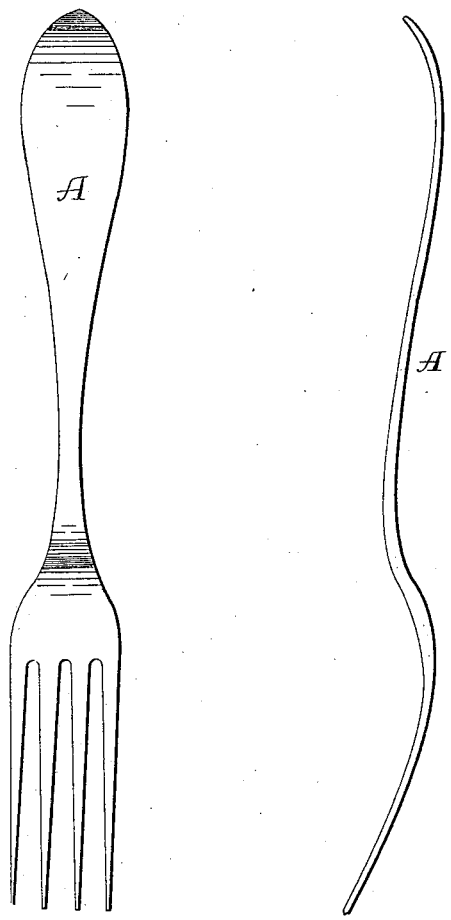

United States Patent Office.

JAMES D. FRARY, OF NEW BRITAIN, CONNECTICUT.

Letters Patent No. 77,026, dated April 21, 1868.

IMPROVEMENT IN MANUFACTURE OF TABLE-FORKS.

The Schedule referred to in these Letters Patent and making part of the same.

TO ALL WHOM IT MAY CONCERN:

Be it known that I, JAMES D. FRARY, of New Britain, county of Hartford, and State of Connecticut, have invented certain new and useful Improvements in the Manufacture of Table-Forks; and to enable others skilled in the art to make the same, I will proceed to describe by referring to the drawings, in which the same letters indicate like parts in each of the figures.

The nature of this invention consists in the substitution of metal for or in place of other metals heretofore used in the manufacture of table-forks, for the purpose of producing certain practical results, which are not attainable or cannot be produced by such metals as are ordinarily used for that purpose, and also to cheapen the manufacture, and produce a better and more desirable article for trade and use.

In other words, it consists of a table-fork with handle and prongs or tines formed of one piece of metal ("steel,") to produce elasticity and prevent distortion, which is not attainable by the use of the softer metals, as silver, German silver, iron, &c.

It is a very common thing to see a silver, German silver, or iron fork, distorted out of its proper shape, sometimes bent so that the prongs will be at about a right angle with the handle, or for the tines to be bent more or less out of place, or in opposite directions, diverging from each other, so as to render them nearly or quite unfit for use.

By the use of this invention, substitution of steel for other metals heretofore used, this annoying condition of the forks is successfully avoided, and a better and cheaper article substituted therefor.

In the accompanying drawings is shown a table-fork, the tines and handle of which are made of steel.

In the manufacture of these forks, the steel is first annealed, the fork punched therefrom in the usual way, hardened, tempered, and finished for plating or for market. This fork, when constructed as above described, is susceptible of sustaining the most severe usage, and yet keep in good order for use.

I believe I have thus shown the nature, construction, and advantage of this improvement, so as to enable others skilled in the art to make the same therefrom.

I do not claim the forging a fork, as in the patent of M. Chapman, November 5, 1867; but

I claim the fork A, punched or cut entire from sheet steel, substantially as described, as an article of manufacture.

JAMES D. FRARY. [L. S.]

Witnesses:
E. W. BLISS,
JEREMY W. BLISS.